United States Patent
Li et al.

(12)

(10) Patent No.: US 6,583,217 B1
(45) Date of Patent: Jun. 24, 2003

(54) COMPOSITE MATERIAL COMPOSED OF FLY ASH AND WASTE POLYETHYLENE TEREPHTHALATE

(75) Inventors: Yadong Li, Flowood, MI (US); R. Lee Peyton, Rocheport, MO (US); David J. White, Ames, IA (US)

(73) Assignees: Iowa State University Research, Inc., Ames, IA (US); The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 09/479,813

(22) Filed: Jan. 7, 2000

Related U.S. Application Data
(60) Provisional application No. 60/116,129, filed on Jan. 15, 1999.

(51) Int. Cl.⁷ .................................................. C08K 3/00
(52) U.S. Cl. ................... 524/650; 521/48; 264/DIG. 49
(58) Field of Search ............................ 524/436, 2, 650, 524/703; 521/48; 523/148

(56) References Cited

U.S. PATENT DOCUMENTS
5,622,556 A  *  4/1997  Shulman ..................... 106/677

OTHER PUBLICATIONS

K.S. Reberz; J.W. Rosett; S.M. Nesbit; A.P. Craft Journal of Materials Science Letters 15 (1996) 1273–1275.*

Alkan, Cihan; Arslan, Mustafa; Cici, Mehmet; Kaya, Mehmet; Aksoy, Mustafa, *A Study on the Production of a New Material From Fly Ash and Polyethylene*, Published by Elsevier in "Resources Conservation and Recycling" vol. 13 (1995), pp. 147–154.

White, David J., *A Composite Building Material from Fly Ash and Recycled Polyethylene Terephthalate (PET)* Abstract submitted to Conference in Las Vegas, Apr. 30, 1998 (2 pages).

Li, Yadong; White, David J.; Peyton, R. Lee, *Composite Material from Fly Ash and Post–Consumer PET*, Published by Elsevier, "Resources, Conservation and Recycling", vol. 24 (1998) (pp. 87–93).

White, David, J., *Microstructure of Composite Material from High–Lime Fly Ash and RPET*, Journal of Materials in Civil Engineering, Feb. 2000 (pp. 60–65).

Steadman, Edward N., *Use of Coal Ash in Recycled Plastics and Composite Materials*, University of North Dakota Energy and Environmental Research Center, Overview of Project Mar. 1994–Mar. 1995, (one page).

Rebeiz, Karim S.; Banko, Amy S.; Craft, Andrew P., *Thermal Properties of Polymer Mortar Using Recycled PET and Fly Ash*, Journal of Materials in Civil Engineering, May 1995 (pp. 129–133).

Rebeiz, Karim S.; Rosett, Julia W.; Craft, Andrew P., *Strength Properties of Polyester Mortar using PET and Fly Ash Wastes*, Journal of Energy Engineering, Apr. 1996 (pp. 10–21).

* cited by examiner

*Primary Examiner*—Edward J. Cain
*Assistant Examiner*—Katarzyna W. Lee

(57) ABSTRACT

A composite material and method are described wherein melted waste, chemically unmodified PET material and fly ash particles are mixed in a vessel to disperse fly ash particles in the melted PET material. The resulting mixture then is cooled to solidify the melted PET material to form a composite material having a matrix comprising PET and dispersoids distributed in the matrix and comprising fly ash particles.

26 Claims, 8 Drawing Sheets

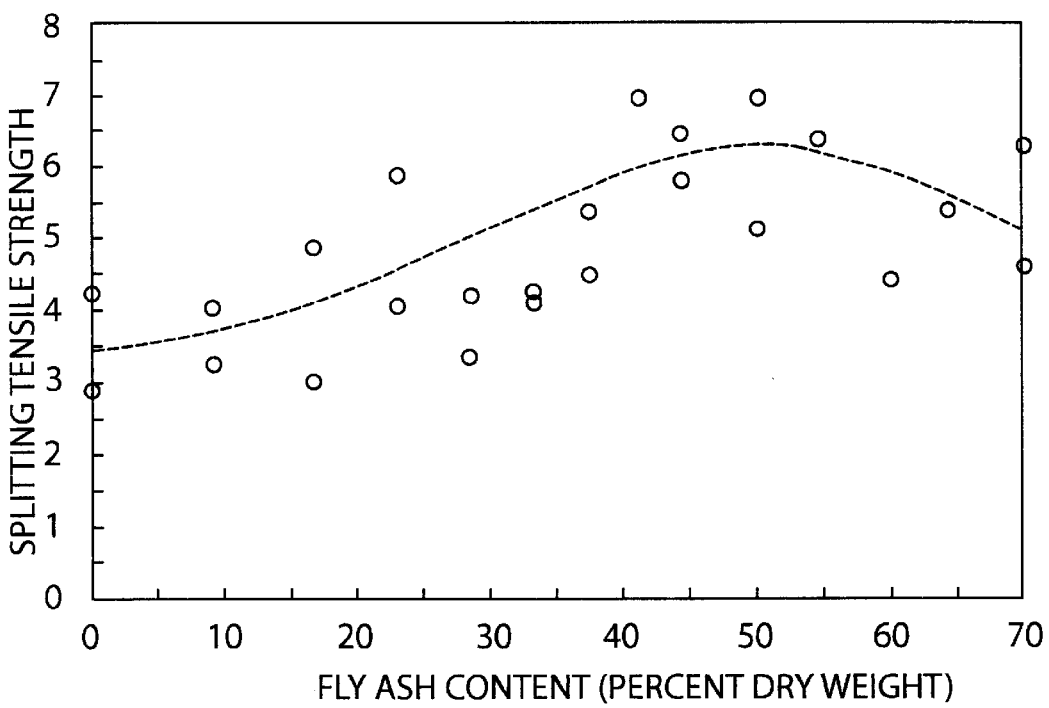
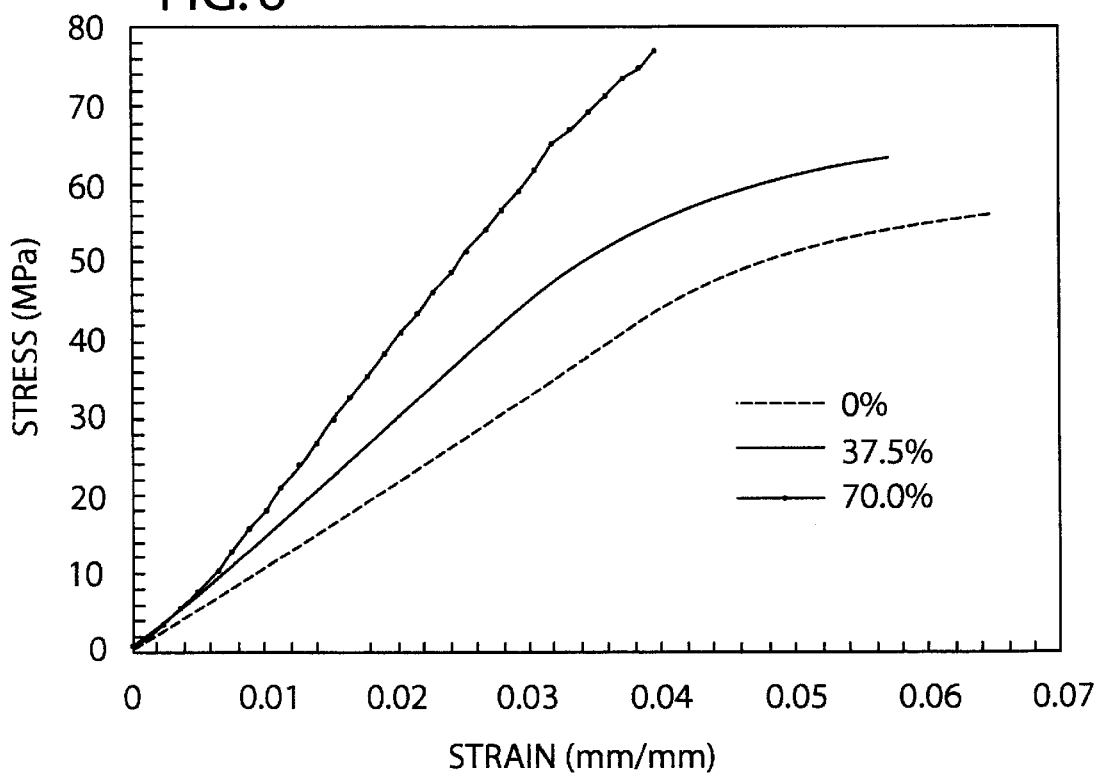

COMPOSITE MATERIAL COMPOSED OF FLY ASH AND WASTE POLYETHYLENE TEREPHTHALATE

This application claims the benefits of U.S. provisional application Ser. No. 60/116,129 filed Jan. 15, 1999.

FIELD OF THE INVENTION

The present invention is related to composite materials and methods for their manufacture using recycled, post-consumer waste polyethylene terephthalate and fly ash.

BACKGROUND OF THE INVENTION

Recognizing the environmental benefits, the production and use of waste materials such as fly ash and plastics has been strongly favored by environmental agencies. High-lime fly ash (ASTM Class C fly ash) is a by-product of coal combustion in electric-generating stations that burn low sulfur sub-bituminous and lignite coals. Relatively low lime (ASTM Class F fly ash) is a by-product of coal combustion in electric-generating stations that burn high sulfur anthracite and/or bituminous coals. Millions of tons of fly ash are generated in the United States each year. Currently, the greatest volumes of cementitious (high lime) fly ash are used in engineering applications such as concrete products, road-base materials, and structural fill materials. The remaining unused fly ash is usually pumped to sluice ponds or transported to landfills as waste, constituting long-term waste management problems.

Waste PET plastic is neither environmentally biodegradable nor compostable, which creates disposal problems. Recycling has emerged as the most practical method to deal with this problem, especially with products such as PET beverage bottles. Currently, a large waste stream is available for recycling applications. In the U.S., estimates indicate that production of PET containers will reach $1.8 \times 10^6$ kg by the year 2000, which is a 55% increase from 1997. Along with increases in waste production, the incentive to develop recycling technologies and value added materials becomes further desirable.

An object of the invention is to provide a composite material from fly ash and recycled, post-consumer waste, chemically unmodified polyethylene terephthalate (PET).

Another object of the invention is to provide a method of making composite material using fly ash and recycled, post-consumer waste, chemically unmodified polyethylene terephthalate (PET).

SUMMARY OF THE INVENTION

The present invention provides a composite material and method wherein melted waste, chemically unmodified PET material and fly ash particles are mixed in a container to disperse fly ash particles in the PET material. The resulting mixture then is cooled to solidify the melted PET material to form a composite material having a matrix comprising PET and dispersoids distributed in the matrix and comprising fly ash particles.

In one embodiment of the invention, the solid waste, chemically unmodified PET material and fly ash particles are premixed and placed in the container for melting of the PET material while the mixture is mixed or stirred. Alternately, the solid waste, chemically unmodified PET material can be melted in the container, and fly ash particles introduced to the melted PET material with mixture stirred or mixed. The mixture of fly ash and melted PET material can be molded, extruded or otherwise formed to shaped articles of manufacture or may be used as a protective coating on a substrate.

The invention envisions use of waste PET material from recycled beverage bottles and other sources. In practice of the invention, the recycled waste PET material is not chemically modified in any way prior to melting. The solid recycled waste PET material may be washed in tap water and shredded or otherwise comminuted prior to melting.

The invention envisions use of different types of fly ash particles including relatively high lime, cementitious ASTM class C and/or relatively low lime class F type fly ash. Preferably, the fly ash comprises relatively high lime ASTM class C fly ash and fly ash with comparable morphological characteristics.

Various amounts of fly ash up to about 70 weight % fly ash can be included in the composite material. Preferably, the fly ash content of the composite material is at least 50 weight % and preferably from 50 to 70 weight %.

The above objects and advantages of the invention will become more readily apparent from the following detailed description taken with the following drawings.

DETAILED DESCRIPTION OF THE DRAWINGS

FIG. 5 is a graph of variation of split-cylinder tensile strength as a function of class C fly ash content of the composite material.

FIG. 6 is a graph of the effect of class C fly ash concentration on the stress/strain response of the composite material.

Figure 9:
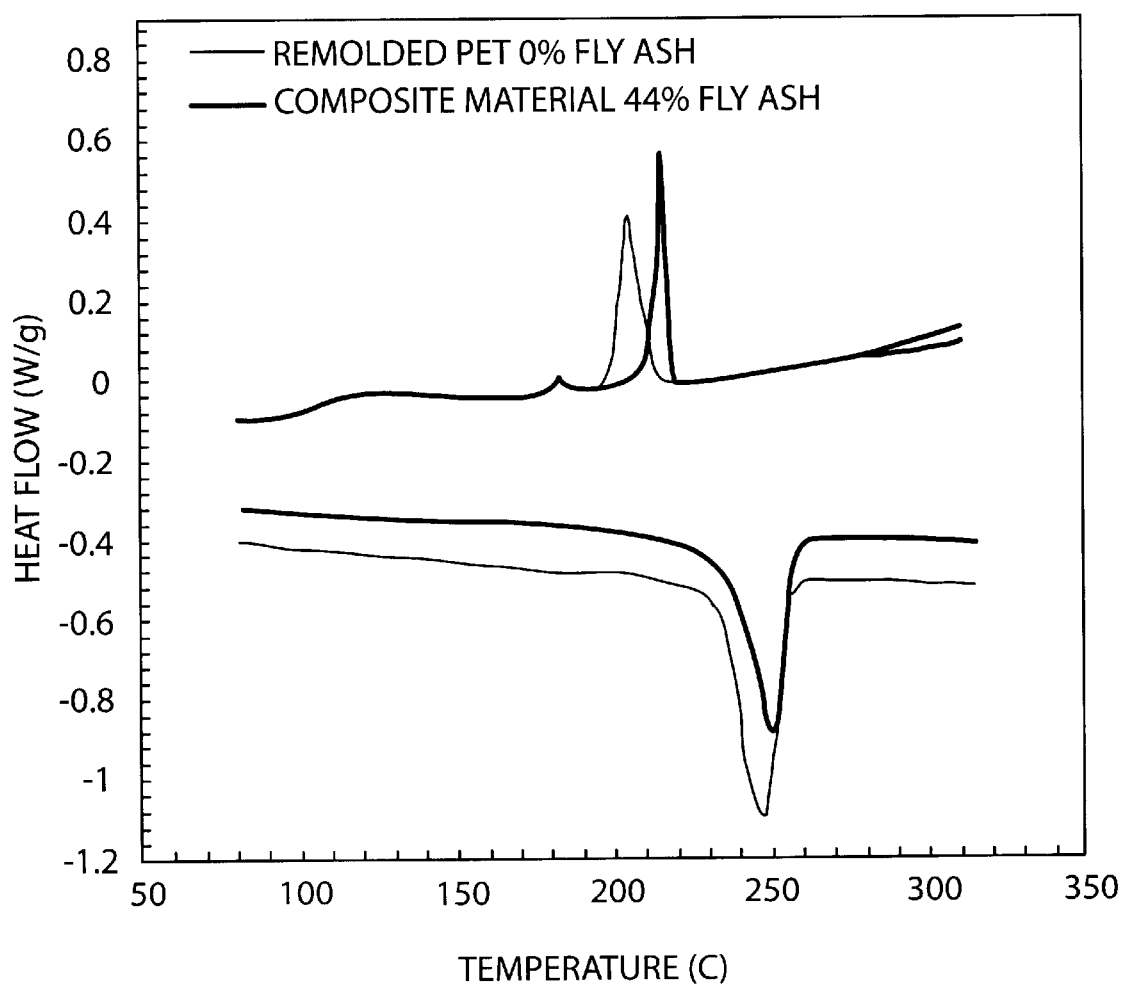

FIG. 9 includes DSC thermograms of remolded PET material devoid of fly ash and composite material with 44.4 weight % class C fly ash content.

Figure 10:
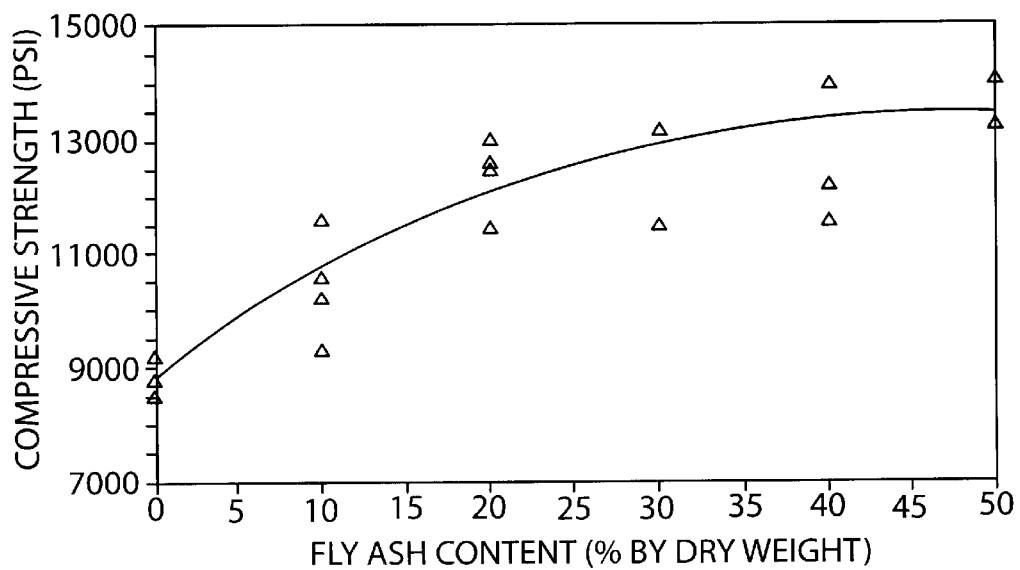

FIG. 10 is a graph of variation of compressive strength as a function of class F fly ash content (dry weight of the fly ash/PET mixture) before melting and molding.

Figure 11:
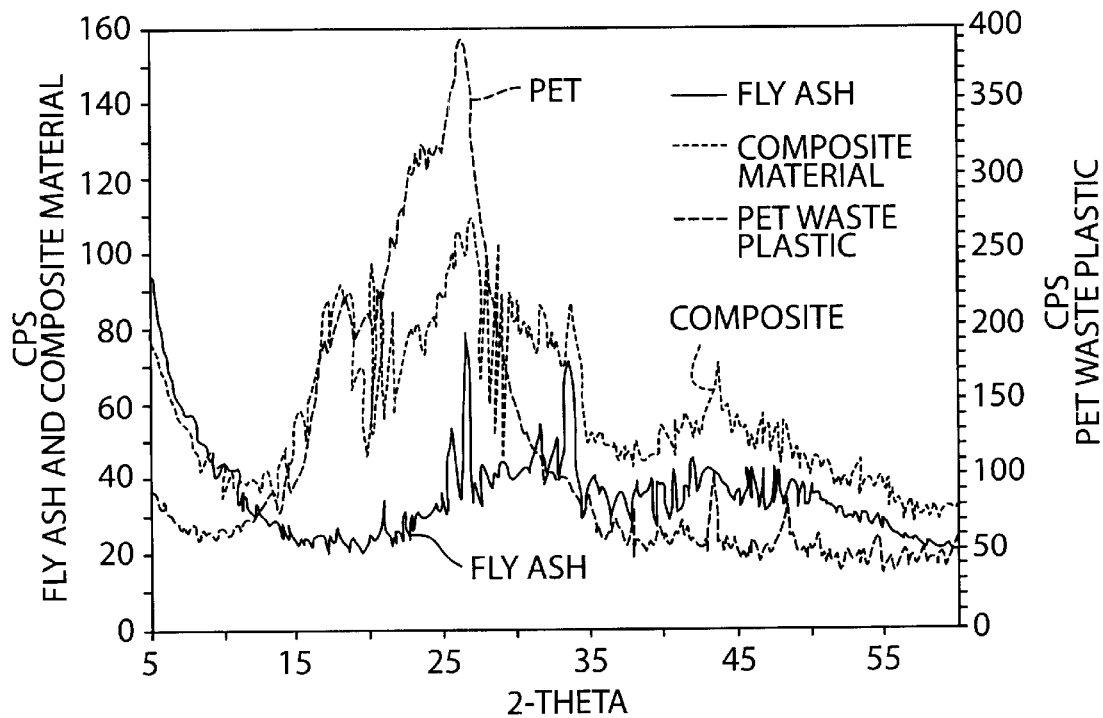

FIG. 11 includes x-ray diffractograms of class F fly ash, waste PET, and composite material including 20 weight % class F fly ash.

DETAILED DESCRIPTION OF THE INVENTION

The present invention will be described first with respect to making a composite material using a relatively high lime ASTM class C fly ash and solid waste, post-consumer recycled PET beverage bottle material.

Fly ash is produced in electric-generating stations by burning finely ground coal at about 1500° C. The type of fly ash produced, typically characterized as high-lime or low-lime, depends on the type of coal burned. For a composite material pursuant to one embodiment of the invention, a high-lime (ASTM class C) fly ash was chosen as the filler or dispersoid material and was produced from combustion of low-sulfur, sub-bituminous coal that originated from the Powder River Basin near Gillette, Wyoming. Low carbon, high calcium content and self-cementitious properties characterize this fly ash. The previously reported chemical analyses from x-ray fluorescence are given in Table 1 along with fineness and specific gravity.

TABLE 1

Chemical constituents and physical properties of fly ash

| NO. (1) | Properties (2) | Value (3) Weight percentage |
|---|---|---|
| A | Chemical composition | |
| 1 | Silicon dioxide ($SiO_2$) | 30.0 |
| 2 | Aluminum oxide ($Al_2O_3$) | 17.0 |
| 3 | Ferric oxide ($Fe_2O_3$) | 6.4 |
| 4 | Sulfur trioxide ($SO_3$) | 4.5 |
| 5 | Calcium oxide (CaO) | 30.2 |
| 6 | Magnesium oxide (MgO) | 7.3 |
| 7 | Phosphorous pentoxide ($P_2O_5$) | 0.9 |
| 8 | Potassium oxide ($K_2O$) | 0.3 |
| 9 | Sodium oxide ($Na_2O$) | 1.5 |
| 10 | Titanium oxide ($TiO_2$) | 1.3 |
| 11 | Strontium oxide (SrO) | 0.4 |
| 12 | Barium oxide (BaO) | 0.8 |
| 13 | LOI (Loss On Ignition) | 0.5 |
| B | Physical Properties | |
| 1 | Specific gravity | 2.68 |
| 2 | Fineness[a] ($\geq 10\mu$) | 11.5% |

Note:
[a]Data from Bergeson et al (1988). Values are averages based on four years of sampling.

[a] as reported by Bergeson et al. in "Development of a rational characterization method of Iowa fly ash", Iowa DOT Project HR-286, Engineering Research Institute Project 1847", Iowa State University, Ames, Iowa 1988.

Typically, high-lime (ASTM class C) Iowa fly ash contains from 20 to 30 weight percent analytical lime (CaO). Physically, ASTM class C fly ash contains more fine and less coarse particles than low-lime (ASTM class F) fly ash. Chemically, ASTM class C fly ash usually is composed of 20 to 30 weight percent crystalline compounds with the remainder being amorphous, glassy materials. ASTM class C fly ash comprises spheroidal particles and a typical particle size distribution (typically from 1 to 25 microns diameter) shown embedded in the composite material in FIG. 1. In practicing the invention, after sampling the fly ash, the moisture content of the fly ash preferably is maintained at less than 1% by oven drying the fly ash to reduce hydration and pozzolanic reactions prior to composite production pursuant to the invention.

PET, which is a thermoplastic polymer, can consist of either a completely amorphous structure or a partially crystalline structure. The crystalline portion of the PET forms because thermoplastics have completely separated molecules that can crystallize by rearrangement and ordering of the molecules. Similar to all crystalline solids, this creates an internal repeating order of molecules or atoms. Upon heating, PET and other thermoplastics polymers can melt, becoming sufficiently free flowing to permit mold filling. In addition, these crystalline polymers have a sharp, identifiable melting point. In the production of the composite material pursuant to the invention, both amorphous and partially crystalline PET containers have been utilized. Since amorphous PET is typically transparent and crystalline PET is opaque, the physical difference between the amorphous and crystalline PET can be readily observed.

Mixtures of transparent, opaque and green post-consumer PET beverage bottles were utilized in the production of the composite material pursuant to the invention without any chemical modification or reaction of the PET material by, for example, digesting, transesterification or other chemical reaction or modification of the waste PET bottle material. The beverage bottles were acquired through a bottle recycling collection effort in Ames, Iowa. The PET bottles prepared for processing by first rinsing in warm water to remove any residue. Next, the bottle caps, labels and adhesives were physically removed. Once washed and air-dried, the PET bottles were shredded to nominal square particle sizes of 0.5 to 6.0 cm to provide solid waste recycled PET particulate material for use in parctice of the invention and stored in an open container to air dry. Shredding was accomplished manually using large shears and scissors. This simple laboratory recycling and processing operation emulated typical commercial PET recycling processes that typically consist of the following steps: (1) segregation of the bottles, (2) air separation to remove metal and paper, (3) flotation to remove non-PET flakes, and (4) final drying. Table 2 contains details of some typical mechanical properties of virgin PET resin used in the production of PET beverage bottles. The data was reported by MacDermott and Shenoy, "Selecting thermoplastics for engineering applications", Marcel Dekker, Inc., New York, N.Y., 1997 for virgin PET resin used in the production of beverage bottles which has a crystallinity that is normally about 25%.

TABLE 2

Physical and mechanical properties of PET resin

| No. (1) | Properties (2) | Value (3) | Test Method (4) |
|---|---|---|---|
| 1 | Tensile Strength | 154 (MPa) | ASTM D-638 |
| 2 | Flexural Strength | 231 (MPa) | ASTM D-790 |
| 3 | Creep Modulus | 6895 (MPa) | ASTM D-638 |
| 4 | Elongation at Break | 3 (%) | — |
| 5 | Specific Gravity | 1.56 | ASTM D-792 |
| 6 | Melting point | 254 (° C.) | — |
| 7 | Average shrinkage | 4–6 (%) | ASTM D-955 |

Note:
Data from MacDermott and Shenoy (1997) for virgin polyethylene terephthalate resin with 30% crystallinity.

In order to manufacture the composite material pursuant to the invention and perform mechanical property testing described below, proportions of ASTM class C dry fly ash and the solid, shredded PET bottle material were heated, homogenized, and molded to form testing specimens. Heating was accomplished by placing the fly ash and shredded PET material in an open pot or container made of stainless steel over an electric burner. During heating, the temperature was controlled between 255 and 265° C. to melt the solid PET material, but not to exceed the decomposition temperature (approximately 270° C.) thereof. While being heated the crystalline property of the PET material brought about an obvious transition temperature from solid to liquid. The mixture of fly ash and melted PET material was homogenized by stirring the mixture with a glass or steel stirring rod, although any mixing or stirring technique can be used to this end to disperse the fly ash particles uniformly throughout the melted PET material. The smooth, spherical shape of the glassy class C fly ash spheroids significantly contributed to the uniform dispersal of fly ash and homogenization of the mixture. The temperature of the fly ash/PET mixture was measured frequently while heating and mixing with a Traceable™ digital thermometer with a type K probe from Fisher Scientific Co.

Alternately, the solid waste, chemically unmodified PET material can be first melted in the vessel, and then the fly ash particles can be introduced to the melted PET material with the mixture being stirred or mixed while the fly ash is introduced. Other sequences of mixing the fly ash and melted PET also may be employed in practice of the invention to provide a uniform dispersal of fly ash particles in the melted PET material.

Since the mechanical properties of the composite material depend strongly on the manufacturing process, the influence of molding temperatures and cooling rates on the composite material were monitored. Once each mixture of fly ash and PET material was heated and homogenized, each mixture was poured into a variety of preheated, internally polished copper right-cylindrical molds to form the specified geometry specimens for testing purposes. The molds were preheated in an oven to a temperature corresponding to the temperature of the fly ash/melted PET mixture to be received in the molds for purposes described below in discussion of making the class F fly ash/PET composite material. After each fly ash/melted PET mixture was poured into each mold, the molds were allowed to cool in air to room temperature for approximately 2 hours to solidify the melted PET material and form a composite material having a matrix comprising PET and dispersoids distributed in the matrix and comprising fly ash particles, FIG. 1. For mechanical property testing purposes, some samples were cut or machined to form flat parallel ends.

Class C fly ash concentration in the composite specimens made in the manner described above ranged from 0 to 70 weight percent by dry weight of the total mixture (composite). For fly ash concentrations over 50 weight %, significantly increased the mixing time to obtain a homogeneous mixture (uniform dispersal of fly ash in the melted PET). Mixtures over 70 weight % fly ash were not possible with the above described mixing methods. Upon cooling and solidification the melted PET matrix material, the composite material pursuant to the invention had a hard, smooth texture, light brown or grey color depending upon fly ash source, and was nontransparent.

In practicing the invention, various amounts of fly ash up to about 70 weight % fly ash can be included in the melted PET material and thus the resulting composite material. Preferably, the fly ash content of the fly ash/melted PET mixture and composite material is at least 50 weight % and preferably from 50 to 70 weight %. However, the fly ash content can range from as little as about 10 weight % or less and up to about 70 weight %.

In manufacture of the composite specimens as described above, fly ash sampling and classification was conducted in accordance with ASTM C 311 and ASTM C 618 procedures, (Annual Book of ASTM Standards, 1996). Specific gravity was measured utilizing a helium pycnometer. Compressive strength of the composite specimens was determined according to ASTM D 695 procedure at a loading rate of 5 mm/min. Split-cylinder tensile strength was performed as per ASTM C 496-86 procedure at a loading rate of 5 mm/min. A material testing system (MTS) was used to test stress-strain characteristics. Deformation readings were taken at a loading rate of 5 mm/min. Microstructural features were studied utilizing a Hitachi model S-2460N scanning electron microscope and an Olympus BHM polarized reflective light microscope with a Pixera Color CCD color system. Differential scanning calorimetry tests were performed with a model 2960 TA Instrument DSC. The samples were heated at a rate of 15° C./min in the temperature range of 50 to 325° C. Immersing the samples into boiling water for 2 hours and measuring the change in mass was used to evaluate water absorption.

Figure 1:
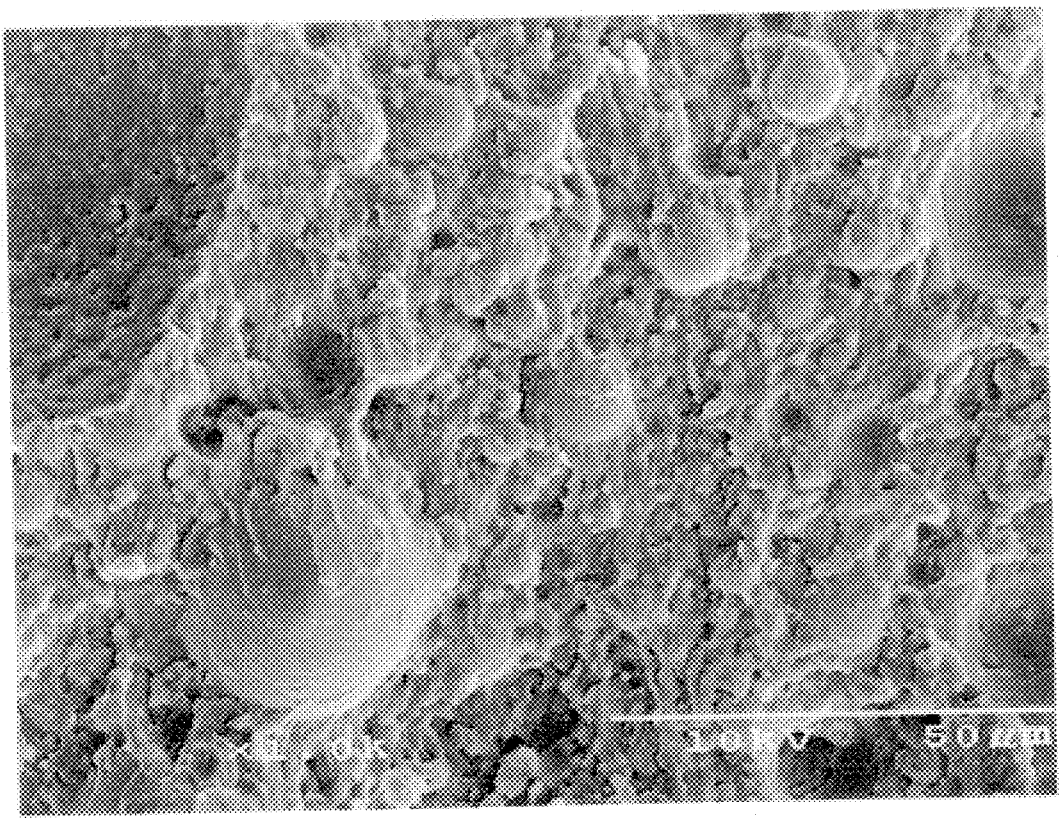
FIG. 1 is a photomicrograph of a composite material with high-lime (class C) fly ash spheroids embedded in PET binder matrix pursuant to the invention.
Figure 2:
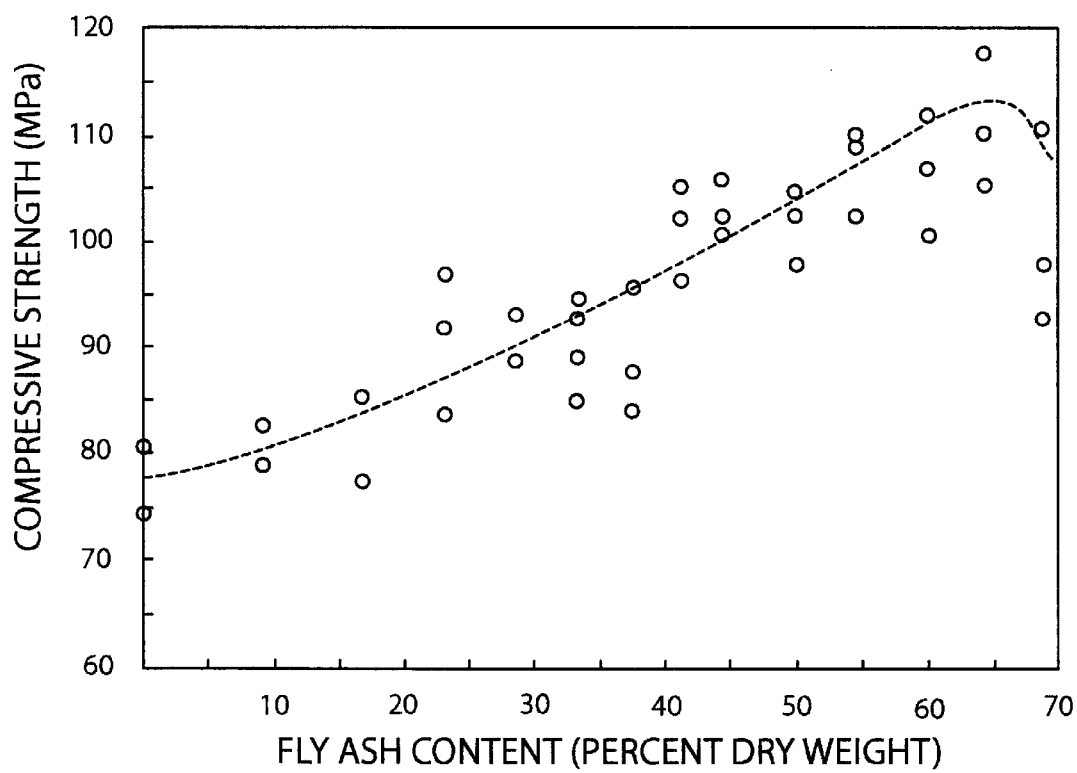
FIG. 2 is a graph of variation of compressive strength as a function of class C fly ash content of the composite material.
Figure 3A:
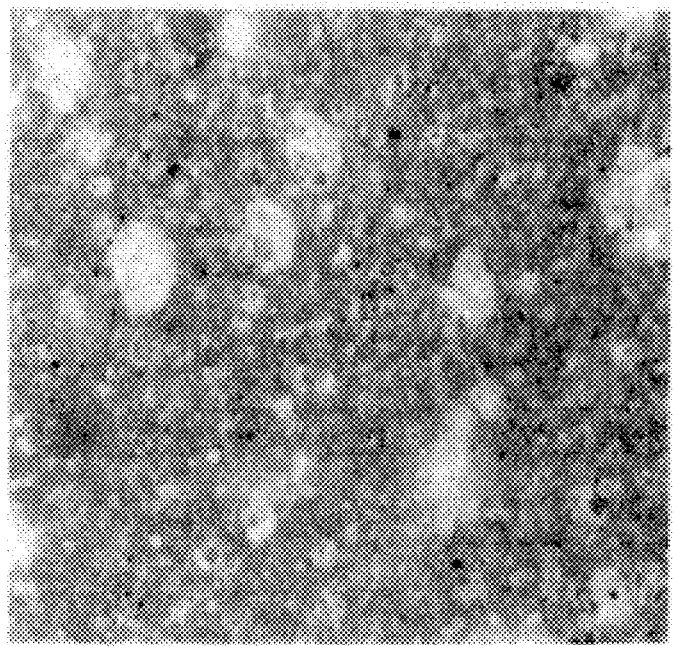
FIGS. 3a and 3b are polarized reflective light images at 60× indicating variation in PET crystal content with fly ash content of 70 weight % fly ash (FIG. 3a) and 20 weight % fly ash (FIG. 3b).
Figure 3B:
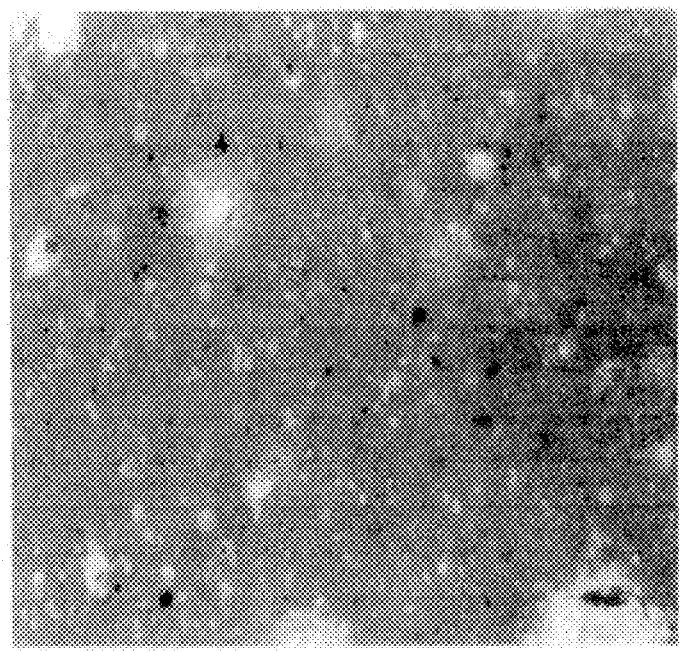
Figure 4A:
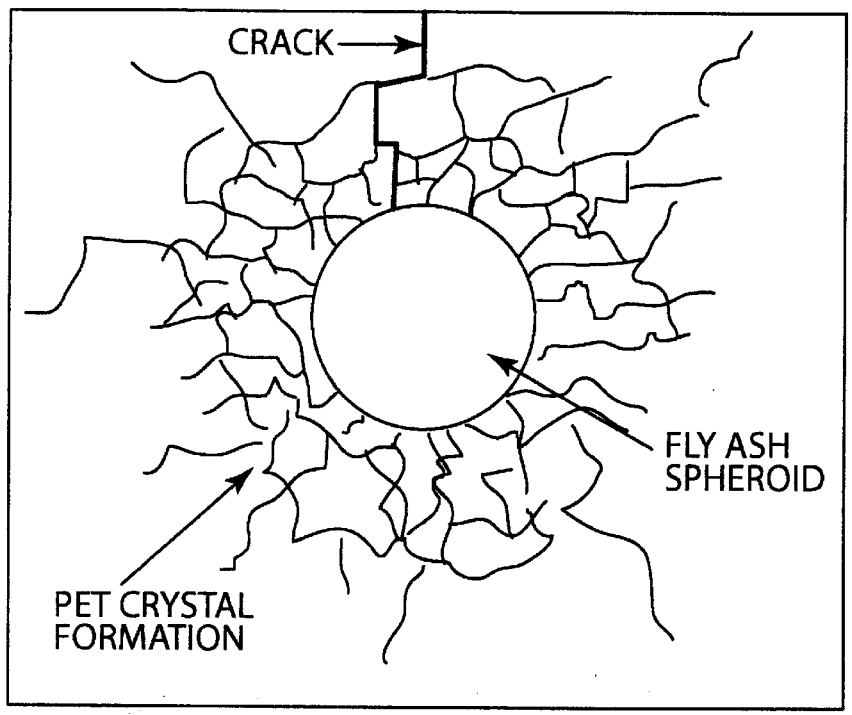
FIG. 4 is a schematic illustration predicting failure mechanisms of composite material with FIG. 4a showing fly ash inhibiting propagation of crack, and FIG. 4b crack propagation around fly ash spheroid at interface through crystalline PET
Figure 4B:
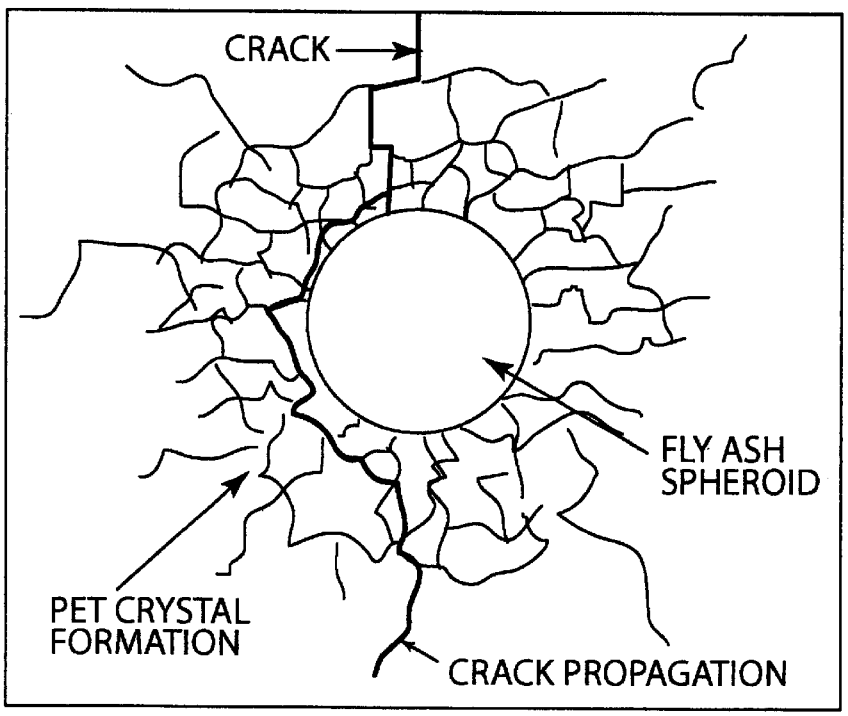

Cylindrical composite specimens with a diameter of 26 mm and a height of 52 mm were manufactured for evaluation of compressive and split-cylinder tensile strength. The compressive strength results are shown in FIG. 2. Compressive strength increased from approximately 77 to 111 MPa as fly ash contents increased from 0 to 65 percent, respectively. The strength gain may be attributed to the increasing crystallinity in the PET matrix of the composite material as the fly ash content increases. During molding, the class C fly ash is believed to act as a thermal insulator. This reduces the cooling rate and increases the crystallinity of the PET material by allowing the PET molecules to arrange themselves in an ordered pattern. As shown in FIG. 3, images from a polarized reflective light microscope show that the crystallinity increases (indicated by bright colored grains) with increasing fly ash content. During compressive loading, the fly ash particles and crystallinity of the PET matrix at interfaces inhibit crack propagation. In addition, solid, glassy fly ash spheroids increase the shear stress area between the interface of fly ash particles and the PET binder matrix. FIG. 1 shows the fractured surface of a composite specimen pursuant to the invention and evidences of strong bonding between the fly ash particles and PET matrix. For comparison, the illustrations in FIGS. 4a and 4b depict the hypothesized variation of PET crystalline boundaries due to the fly ash and a predicted model of crack propagation. In FIG. 4a, the fly ash particle is illustrated as stopping (inhibiting) a crack from progressing, while in FIG. 4b, the fly ash particle causes the crack to propagate around the particle which increases the stress (energy) required to produce an equivalent (effective) crack length in contrast to the stress (energy) required with no fly ash particle present in the matrix.

Due to the lack of complete fly ash particle coverage when fly ash content was beyond approximately 65 to 70 weight percent fly ash in the fly ash/melted PET mixture, the compressive strength decreased as shown on FIG. 2 at these fly ash contents. At high fly ash concentrations, interfacial bonding could possibly be enhanced with increased mixing and homogenization. Results indicate that at 65 weight % fly ash content, the compressive strength is 4 to 5 times higher than ordinary portland cement concrete.

The strength of the composite material in tension is an important property that greatly affects the extent and size of cracking at failure. Results of tensile strength tests are shown in FIG. 5. Tensile strength varied from 3 to 7 MPa for class C fly ash contents of 0 to 70 weight % with 50 weight % being about optimum. The split-cylinder tensile strength $f_{ct}$ has been found to be proportional to the compressive strength $f'_c$ such that:

$$f_{ct} = 0.4 \text{ to } 0.7 \sqrt{f'_c} \tag{1}$$

where $f_{ct}$ and $f'_c$ are in units of MPa.

Over a fly ash concentration of about 50 weight %, the tensile strength decreased conceivably due to an increased area of fracture planes. Despite its plastic nature the composite tensile strength was highly variable and was about 4 to 6 percent of the compressive strength, which is comparable to concrete.

Compressive strength stress-strain curves for composite specimens made with fly ash concentrations of 0, 37.5 and 70 weight percent are shown on FIG. 6. From this data, it was observed that at 0 weight % fly ash content, the remolded PET material devoid of fly ash was relatively ductile. Upon increasing the fly ash concentration, the stiffness of the composite material increased, and the composite material became more brittle. Therefore, given the same stress levels, an increased fly ash content decreases the strain at failure. Elastic modulus values of the composite specimens ranged from 1185.7 MPa at 0 weight % fly ash to 2252.3 MPa at 70 weight % fly ash, which are on the order of 10 times less than that of ordinary portland cement concrete. Such properties are advantageous if the composite material is considered for use in areas of energy and impact attenuation. For fly ash concentrations $C_{FA}$ between 0 and 60 weight %, the elastic modulus of the composite, $E_c$, data collected suggests:

$$E_c = 125 \text{ to } 135 \left(1 + \frac{C_{FA}}{100}\right) \sqrt{f_c} \quad (2)$$

where $E_c$ and $f_c$ are expressed in units of MPa and $C_{FA}$ expressed as percent dry weight of the total mixture.

In the above equations and elsewhere herebelow, the following symbols are used:

$F_{ct}$=split-cylinder tensile strength
$F'_c$=compressive strength of composite material
$C_{FA}$=percent concentration of dry fly ash by total mass
$E_c$=modulus of elasticity of composite material
$T_m$=peak melting temperature
$T_c$=peak cooling crystallization temperature
$\Delta H$=change in enthalpy Values of average strength, elastic modulus, density, water absorption, and shrinkage of the composite test specimens are shown in Table 3.

The density of the composite test specimen material varied from 1.28 to 2.03 g/cm³ for fly ash content of 0 to 70 weight percent. Thermodynamic shrinkage during manufacturing decreased from 2.2% with no fly ash to 0.7 weight % with a 70 weight % fly ash concentration. Water absorption was very low and variable from 0 to 0.9 percent. The fly ash particles, as shown on FIG. 1, are actually coated with a thin layer of tightly bonded PET matrix material, preventing exposure to water. However, at fractured surfaces, sheared cenosphere and plerosphere fly ash particles and some solid, glassy fly ash spheroids were exposed and susceptible to water exposure. With this in mind, the cementitious properties of the high lime-fly ash particles in the composite material could be taken advantage of by expanding the potential uses of the material. For example, if the composite material was utilized in-place of conventional masonry brick where it would be exposed to mortar, the bond between the mortar and fly ash particles in the composite material could increase the overall strength of the masonry system. Overall, the low density and high-lime fly ash makes it an alternative for a variety of construction materials such as light to medium weight concrete aggregate or lightweight construction panels.

Figure 7:
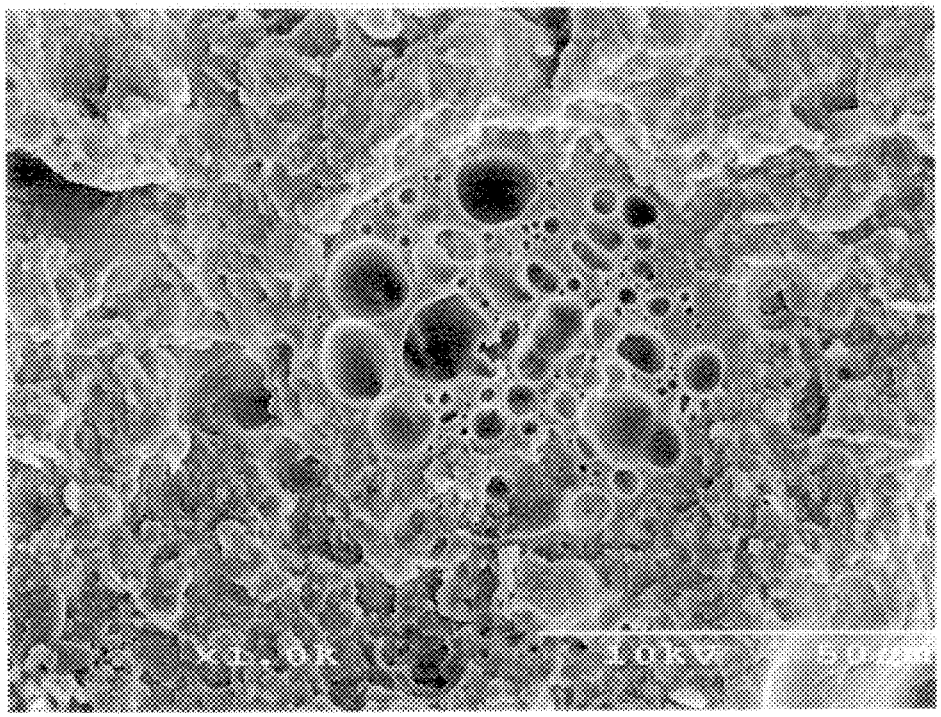
FIG. 7 is a photomicrograph of a sheared surface of class C fly ash plerosphere embedded in composite PET binder matrix.
Figure 8:
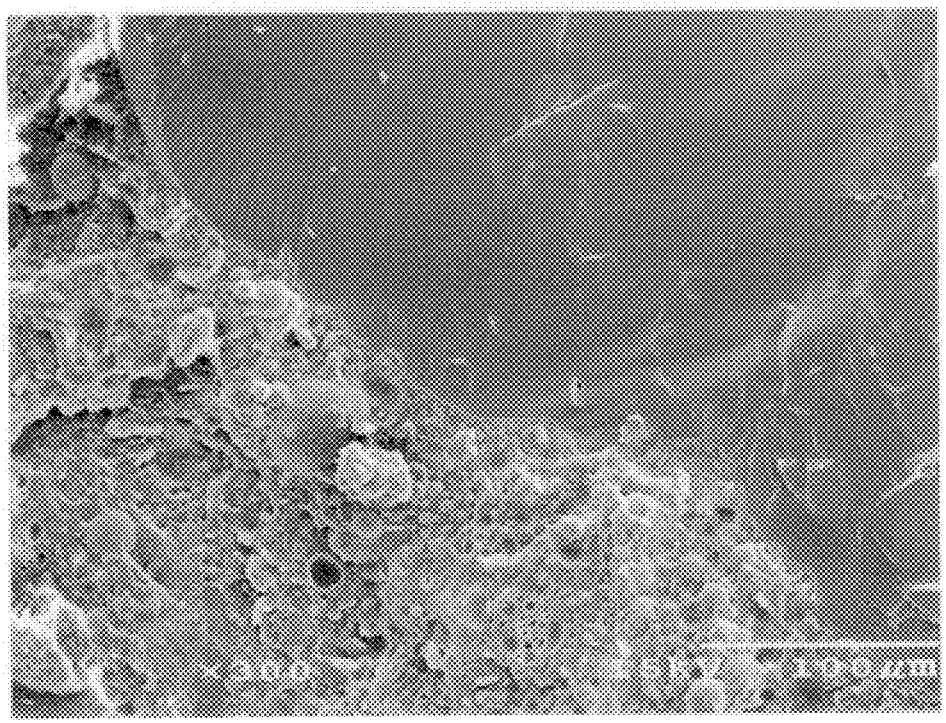
FIG. 8 is a photomicrograph of a tightly bound interface of composite material at sheared surface of embedded sand grain in the composite material.

As shown on FIG. 1, it appears that the high-lime (ASTM class C) fly ash particles were completely, uniformly dispersed and homogenized and coated with PET matrix during mixing of the fly ash and melted PET material. FIG. 7 indicates a tightly bound plerosphere sheared in half along a fractured surface. To further investigate the ability of the composite material to physically bond and adhere to materials, ordinary concrete sand was mixed with the class C fly ash and melted PET material in the manner described above where the sand and fly ash were premixed with solid shredded PET bottle material. FIG. 8, shows the tightly bound interface between a sand grain and the PET matrix of the composite material along a fractured surface. The bonding strength of the composite material has been shown to exceed the shear strength of cenosphere and plerosphere fly ash particles, solid, glassy fly ash spheroids and common concrete sand grains.

To further study the crystalline behavior of the composite material pursuant to the invention and to provide insight into

TABLE 3

Comparative properties of composite material

| No. (1) | Fly Ash Content (weight percentage) (2) | Density g/cm³ (3) | Average Experimental Results[a] | | Modulus of Elasticity (MPa) (6) | Water Absorption 2 hr (% by wt) (7) | Shrinkage (%) (8) |
|---|---|---|---|---|---|---|---|
| | | | Compressive Strength (MPa) (4) | Split-cylinder Tensile (MPa) (5) | | | |
| 1 | 0 | 1.28 | 77.4 | 3.6 | 1185.7 | 0.0 | 2.24 |
| 2 | 9.1 | 1.32 | 80.7 | 3.7 | 1229.9 | 0.9 | 2.02 |
| 3 | 16.7 | 1.38 | 81.3 | 4.0 | —[b] | 0.6 | 1.88 |
| 4 | 23.1 | 1.43 | 90.8 | 5.1 | —[b] | 0.3 | 1.85 |
| 5 | 28.6 | 1.48 | 90.9 | 3.9 | —[b] | 0.3 | 1.80 |
| 6 | 33.3 | 1.52 | 90.4 | 4.3 | —[b] | 0.8 | 1.47 |
| 7 | 37.5 | 1.57 | 89.1 | 5.0 | 1572.0 | 0.7 | 1.42 |
| 8 | 41.2 | 1.61 | 101.3 | 7.1 | —[b] | 0.5 | 1.44 |
| 9 | 44.4 | 1.65 | 103.0 | 6.3 | —[b] | 0.8 | 1.54 |
| 10 | 50.0 | 1.72 | 101.7 | 6.2 | 2018.4 | 0.1 | 1.35 |
| 11 | 54.6 | 1.79 | 107.2 | 6.6 | —[b] | 0.4 | 1.54 |
| 12 | 60.0 | 1.87 | 106.7 | 4.5 | 2248.8 | 0.5 | 1.25 |
| 13 | 64.3 | 1.93 | 111.2 | 5.5 | —[b] | 0.5 | 1.33 |
| 14 | 68.8 | 2.01 | 100.5 | —[b] | —[b] | 0.2 | 0.96 |
| 15 | 70.0 | 2.03 | —[b] | 5.6 | 2252.3 | 0.2 | 0.67 |

[a]Based on two or three samples
[b]Sample was not tested the effects of fly ash concentration on PET crystallinity, DSC (differential scanning calorimetry) studies in the heating (endothermic) and cooling (exothermic) mode were performed. A sample of remolded PET material with no fly ash and a sample with 44.4 weight % fly ash/balance PET were cut from the surfaces of fractured test specimens. The average sample weight was 7.2 mg. The thermograms are shown on FIG. 9 and were used to calculate the peak melting temperature $T_m$, peak cooling crystallization temperature $T_c$, and the corresponding enthalpy changes $\Delta H$. The results are displayed in Table 4. Note below approximately 1500° C. the fly ash particles are inert and do not melt within the DSC test temperature range.

TABLE 4

DSC transition temperatures and enthalpy and composite material

| No. (1) | Fly Ash content (%) (2) | $T_M$ (° C.) (3) | $T_C$ (° C.) (4) | $\Delta H_{melting}$ (J/g) (5) | $\Delta H_{cooling}$ (J/g) (6) |
|---|---|---|---|---|---|
| 1 | 0 | 246.7 | 205.4 | 35.7 | 38.3 |
| 2 | 44.4 | 250.4 | 215.9 | 27.4 | 28.8 |

The $T_m$'s for remolded PET material with no fly ash and the composite material with 44.4% fly ash were 246.7° C. and 250.4° C., receptively. The difference of 3.7° C. is on account of the variations in crystallinity induced in the PET matrix by fly ash. As the crystalline structure becomes more ordered, Tm will increase. The remolded PET material with no fly ash consists of a lower amorphous fraction than the 44.4% weight % fly ash/PET composite material. Therefore, due to its crystalline component and more orderly molecular structure, the $T_m$ of the composite material with increased fly ash content will be higher than that of the composite material at low fly ash concentrations.

The PET exotherm associated with crystallization shifts to a lower temperature with increasing cooling rates. Peak cooling crystallization temperatures for the remolded PET material with no fly ash and composite material with 44.4 weight % fly ash were 205.4° C. and 215.9° C., receptively. Thus, a relationship exists between the fly ash concentration in the composite material and the PET peak cooling temperature of crystallization. The fly ash in the composite material manifests an increase in $T_c$ by reducing the cooling rate during manufacturing. With this in mind, the influences of fly ash and cooling rates during manufacturing could have a significant impact on material properties. Some advantages of higher crystallinity include greater resistance to organic solvents and dynamic fatigue. The cooling rate of the fly ash/melted PET mixture in a mold can be controlled to provide the composite material of the invention with a selected crystallinity to this end.

From the above description, the invention provides a value added composite material made using high-lime (ASTM class C) fly ash and waste recycled, chemically unmodified PET material. In addition to environmental incentives for utilization of waste materials, favorable mechanical properties such as low density, minimal water absorption and high compressive strength create several potential uses for the composite material. The cementitious properties of the high-lime class C fly ash at fractured surfaces add diversity to potential products and applications for the composite material such as masonry brick and concrete aggregate.

The fly ash influences cooling rates and crystallinity of the PET binder matrix during cooling, which allows for an influence of mechanical properties through manufacturing.

The crystallinity of PET matrix maybe controlled to influence the fracture mechanics of the composite material. Further, high-lime class C fly ash has been found to be economical as filler in the composite material reducing potential manufacturing costs.

The mixture of fly ash and melted PET material can be conventionally molded, extruded or otherwise formed to shaped articles of manufacture, such as building materials including bricks, blocks, and the like, light-weight aggregate for concrete, or may be applied to a substrate as a protective acid resistant coating.

The present invention will be described now with respect to making a composite material using a relatively low lime ASTM class F fly ash and solid waste, post-consumer recycled PET beverage bottle material.

The waste PET material used throughout these experimental tests was obtained from the City of Columbia Sanitary Landfill which accepts municipal solid waste (MSW) from a seven-county area in central Missouri. In addition, waste PET was also obtained through a recycling collection effort and from a recycling company.

The class F fly ash used throughout this study was obtained from a power plant in the St. Louis, Mo. metropolitan area. The fly ash is characterized as ASTM class F fly ash and is produced when anthracite or bituminous coal is burned. Class. F fly ash generally contains less than 10 weight % lime (CaO). The class F fly ash particles were generally spherical and similar in size to portland cement or lime. The class F fly ash included irregular shaped, jagged carbon particles in minor amount. The typical chemical composition of the ASTM class F fly ash reported by U.S. DOT is shown in Table 5.

TABLE 5

| Compounds | Percent by weight |
|---|---|
| $SiO_2$ | 54.9 |
| $Al_2O_3$ | 25.8 |
| $Fe_2O_3$ | 6.9 |
| CaO (Lime) | 8.7 |
| MgO | 1.8 |
| $SO_3$ | 0.6 |

See report by U.S. Department Of Transportation, "Fly Ash Facts for Highway Engineers", FHWA-SA-94-081, August, 1995.

Recycled, post-consumer waste PET beverage bottles were used. The bottle caps, which consist of polypropylene (PP), and the labels which consist of combinations of paper/plastic and all-plastic, were removed before shredding the PET bottles. The bottles were shredded to a nominal maximum size of 1 inch square shapes. The shredded plastic was then washed and dried by natural venting. Shredding was accomplished manually using large shears and scissors. Special care was taken to remove any portions of the beverage bottles which had label adhesives on them which would contaminate the sample.

The fly ash consisted of sufficiently fine particles that did not need to be further reduced. The fly ash was dried in an oven at 105° C. to 110° C. prior to mixing with the plastic and stored in a desiccator.

The production of the test specimens of the composite material involved the same general steps as described above for the class C fly/PET material. That is, the shredded PET bottle material and fly ash were mixed together at the desired mixture proportions prior to heating The fly ash mixtures varied from 0% to 50% by weight. The material was mixed by hand with a stirring rod in an open heated pot. The pot was heated by a one burner electric stove. The composite material became a fluid when heated above the melting point. The temperature was measured frequently while heating and mixing with a Traceable™ digital thermometer with a type K probe. The composite material was mixed throughout the heating process until the mixture became homogeneous, which was to be transferred to the mold.

The observed melting temperature of the shredded PET bottle material without fly ash ranged from 250° C. to 260° C., which was consistent with that of PET resin (Modern Plastics Encyclopedia, 1992). It was also observed that the PET started fuming substantially when the temperature was higher than 270° C.

However, the melting temperature of the fly ash/PET mixture was observed to be from 260° C. to 280° C., and only small amounts of fume were observed when the temperature was below 300° C.

Once the class F fly ash/PET material was heated to melt PET and mixed thoroughly, the fly ash/melted PET mixture was poured from the heated pot into vertical cylindrical molds having an inside diameter of 20 mm and a height of 70 mm. Prior to pouring the melted material into the molds, the molds were oven preheated to about the same temperature as the mixture so that the material and the mold could cool synchronously to achieve a quality product. The composite mixture was observed to cool almost instantaneously on the wall of the mold if the mold were not heated. Therefore, by preheating the mold, the composite mixture was allowed to flow to the bottom of the mold without blockage. This was important to reduce void spaces within the product. The addition, internal stresses produced from shrinkage were minimized. The composite material shrank when cooled such that the test specimens could be easily removed from the molds.

The molded test specimens of the composite material were machined to form right cylinders whose length was twice the diameter, to be used as test specimens. Great care was taken in machining the ends so that smooth flat parallel surfaces were made. The length and diameters were measured to be 40±0.64 mm and 20±0.32 mm using a micrometer which read to the nearest 0.01 mm. Based on the standard ASTM D-695 procedure, (Annual Book of ASTM Standards, 1996), the compressive strength test was performed on specimens with fly ash content ranging from 0% to 50% by weight. The results are shown in FIG. 10.

FIG. 10 shows the compression strength tests for fly ash/PET composite material with fly ash contents ranging from 0% to 50% by weight. For compressive strength, the optimum class F fly ash content appears to be between 40 weight % and 50 weight %. During testing it was observed that the composite material with low fly ash content would rupture and shatter without visible sign of deflection when the ultimate compressive load was applied. Conversely, the composite material with class F fly ash contents of 40 weight % to 50 weight % did not shatter, but deflected and bulged when the loading was applied. This indicates that as the fly ash content increases the ductility of the composite material also increases.

Compressive strengths ranged from 10,800 to 14,100 lb/in$^2$ (74.46 to 97.22 Mpa) for fly ash contents of 10 weight % to 50 weight %, respectively. The compressive strength for specimens made from pure waste PET devoid of fly ash was approximately 8,800 lb/in$^2$ (60.67 Mpa). Even better results would be expected if an injection molding machine was used to produce the testing specimens.

Table 6 sumarizes the results on the properties of the composite material made with class F fly ash and waste PET with different fly ash contents.

TABLE 6

Measured properties of the composite material made of class F fly ash and waste PET with different fly ash contents

| Fly ash content (%) | Shrinkage (%) | Density (g/cm$^3$) | Compressive strength (MPa) | Water absorption (%) |
| --- | --- | --- | --- | --- |
| 0  | 3.9  | ND*  | 61.1 | ND* |
| 10 | 3.5  | 1.33 | 80.2 | 0.26 |
| 20 | 3.1  | 1.34 | 88.4 | 0.25 |
| 30 | 2.9  | 1.40 | 86.5 | 0.36 |
| 40 | 2.1  | 1.50 | 82.1 | 0.23 |
| 50 | 0.54 | 1.58 | 93.4 | 0.18 |

*Data not measured.

To investigate possible bonding reaction between the PET matrix and the class F fly ash, x-ray diffraction anaylsis of the fly ash, waste PET, and composite material including 20 weight class F fly ash was performed. FIG. 11 includes the x-ray diffractograms of the fly ash, waste PET, and composite material including 20 weight class F fly ash.

By comparing the plots of the x-ray diffractograms, it does not appear that the composite of the PET matrix and the fly ash dispersoids (filler) produced any new constiutents. This was determined based on the plot of the composite material, which appears to be simply a combination of the fly ash plot and PET plot.

According to the Uniform Building Code Standard No.24-1 through 24-9 (1985), the class C/F fly ash/PET composite material pursuant to the invention easily meets the minimum requirements of compressive strength for concrete building bricks, clay building bricks, hallow and solid load bearing concrete masonry units and a variety of structural and non-structural tiles.

Although the invention has been described above with respect to certain embodiments, those skilled in the art will appreciate that the invention is not limited to these embodiment and that changes, modifications and the like can be made within the scope of the invention as set forth in the following claims.

We claim:

1. A method of making a composite material, comprising:
    mixing melted waste, chemically unmodified PET material and fly ash particles to distribute the fly ash particles in said melted PET material, and
    solidifying the melted PET material with the fly ash particles therein to provide a composite material having a matrix comprising PET and fly ash particles distributed throughout said matrix.

2. The method of claim 1 wherein solid waste, post-consumer, chemically unmodified PET material and said fly ash particles are mixed together to form a mixture and then the mixture is heated in to a temperature to melt said PET material.

3. The method of claim 2 including comminuting said solid waste, post-consumer PET material to provide waste PET particles that are mixed with said fly ash particles to form said mixture.

4. The method of claim 3 wherein said solid, waste, post-consumer PET material comprises beverage bottles that are comminuted.

5. The method of claim 1 wherein said fly ash particles comprise spheroidal particles.

6. The method of claim 5 wherein said fly ash particles comprise relatively high lime fly ash.

7. The method of claim 6 wherein said fly ash particles comprise Class C fly ash.

8. The method of claim 1 wherein said fly ash particles comprise relatively low lime fly ash.

9. The method of claim 8 wherein said fly ash particles comprise Class F fly ash.

10. The method of claim 1 wherein at least about 50 weight % of said mixture comprises said fly ash particles.

11. The method of claim 10 wherein said mixture comprises about 50 weight % to about 70 weight % of said fly ash particles.

12. The method of claim 1 including shaping the melted PET material with fly ash particles therein and solidifying said melted PET material.

13. The method of claim 12 wherein the melted PET material with fly ash particles therein are introduced into a mold and cooled below the melting point of said PET material.

14. The method of claim 11 wherein the cooling rate of said melted PET material in said mold is controlled to provide said composite material with a selected crystallinity.

15. Composite material having a matrix comprising PET and fly ash particles distributed in said matrix.

16. The material of claim 15 wherein said matrix comprises chemically unmodified PET material.

17. The material of claim 15 wherein said fly ash particles comprise spheroidal fly ash particles.

18. The material of claim 15 wherein said fly ash particles comprise relatively high lime fly ash.

19. The material of claim 18 wherein said fly ash particles comprise Class C fly ash.

20. The material of claim 15 wherein said fly ash particles comprise relatively low lime fly ash.

21. The material of claim 20 wherein said fly ash particles comprise Class F fly ash.

22. The material of claim 15 wherein at least about 50 weight % of said material comprises said fly ash particles.

23. The material of claim 22 wherein said material comprises about 50 weight % to about 70 weight % of said fly ash particles.

24. A molded body comprising the composite material of claim 15.

25. The body of claim 24 which is injection molded.

26. A coating on a substrate wherein said coating comprises the composite material of claim 15.

* * * * *

UNITED STATES PATENT AND TRADEMARK OFFICE
CERTIFICATE OF CORRECTION

PATENT NO. : 6,583,217 B1
DATED : June 24, 2003
INVENTOR(S) : Yadong Li et al.

It is certified that error appears in the above-identified patent and that said Letters Patent is hereby corrected as shown below:

<u>Title page,</u>
Item [75], replace "Yadong Li," Flowood, MI" with -- Yadong Li, Flowood, MS --.

Signed and Sealed this

Twenty-eighth Day of October, 2003

JAMES E. ROGAN
*Director of the United States Patent and Trademark Office*